No. 689,820. Patented Dec. 24, 1901.
E. L. HOWARD.
POSTMARKING AND STAMP CANCELING MACHINE.
(Application filed Feb. 17, 1890.)
(No Model.) 7 Sheets—Sheet 1.
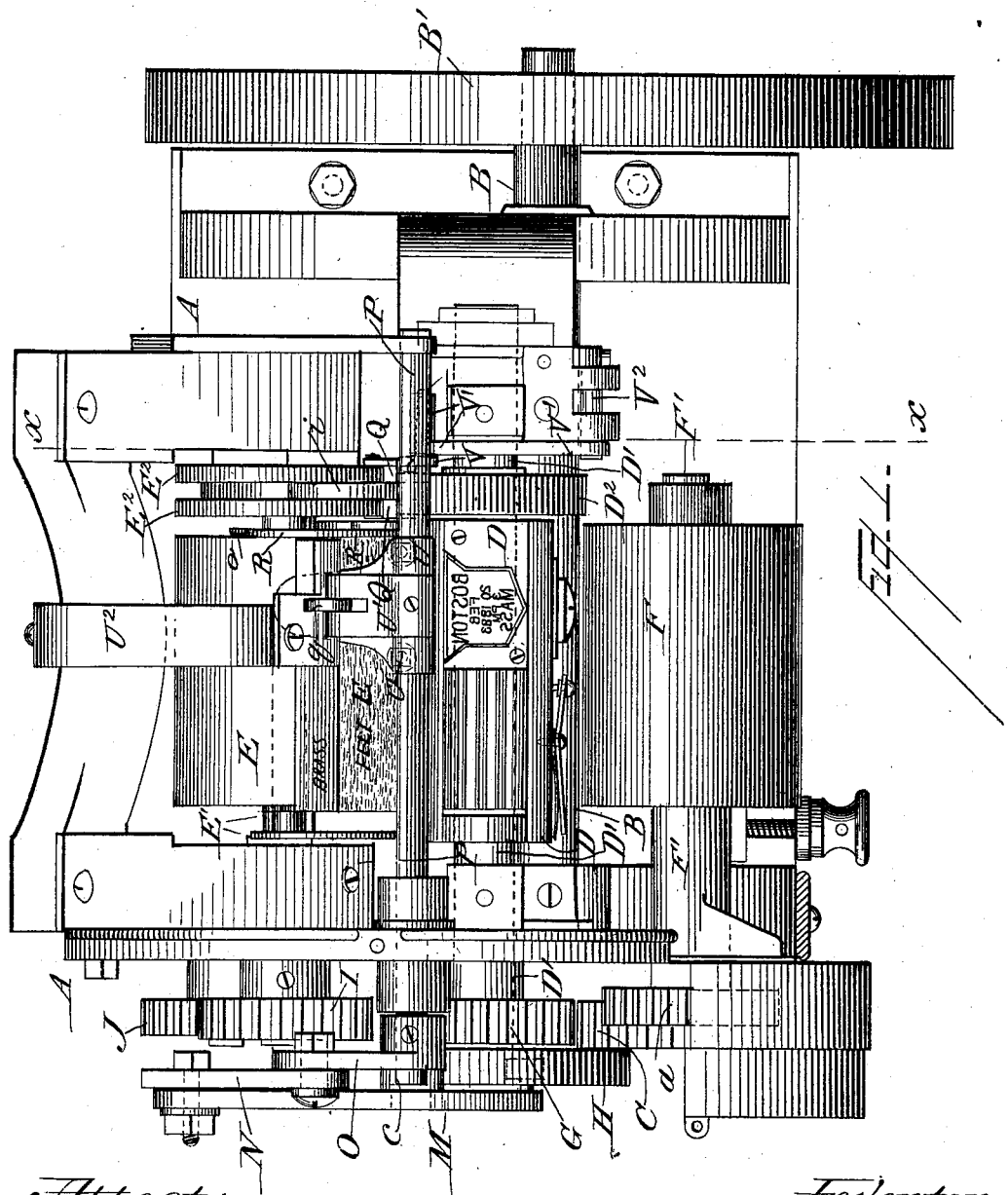

No. 689,820. Patented Dec. 24, 1901.
E. L. HOWARD.
POSTMARKING AND STAMP CANCELING MACHINE.
(Application filed Feb. 17, 1890.)
(No Model.) 7 Sheets—Sheet 2.
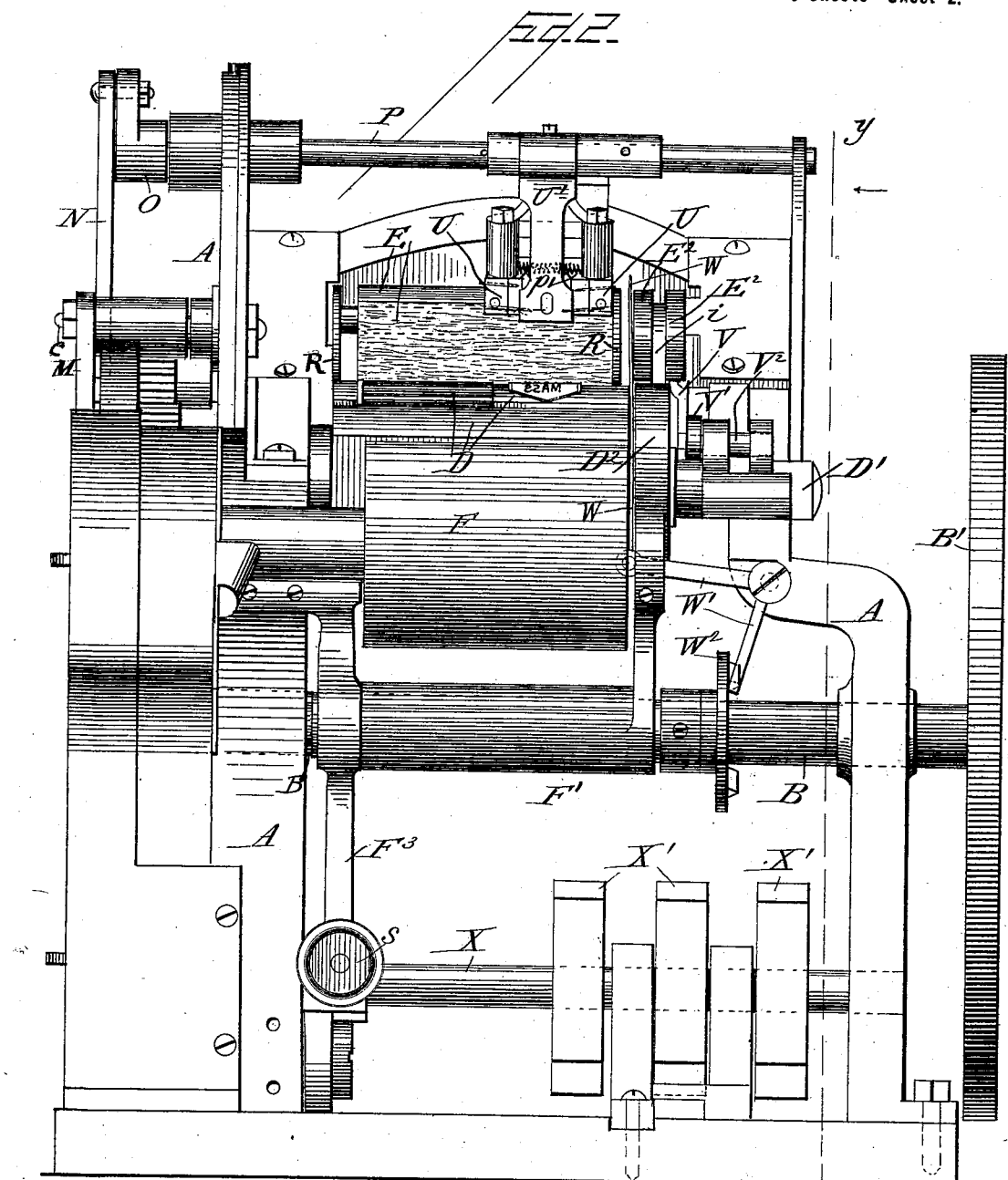

No. 689,820. Patented Dec. 24, 1901.
E. L. HOWARD.
POSTMARKING AND STAMP CANCELING MACHINE.
(Application filed Feb. 17, 1890.)
(No Model.) 7 Sheets—Sheet 3.
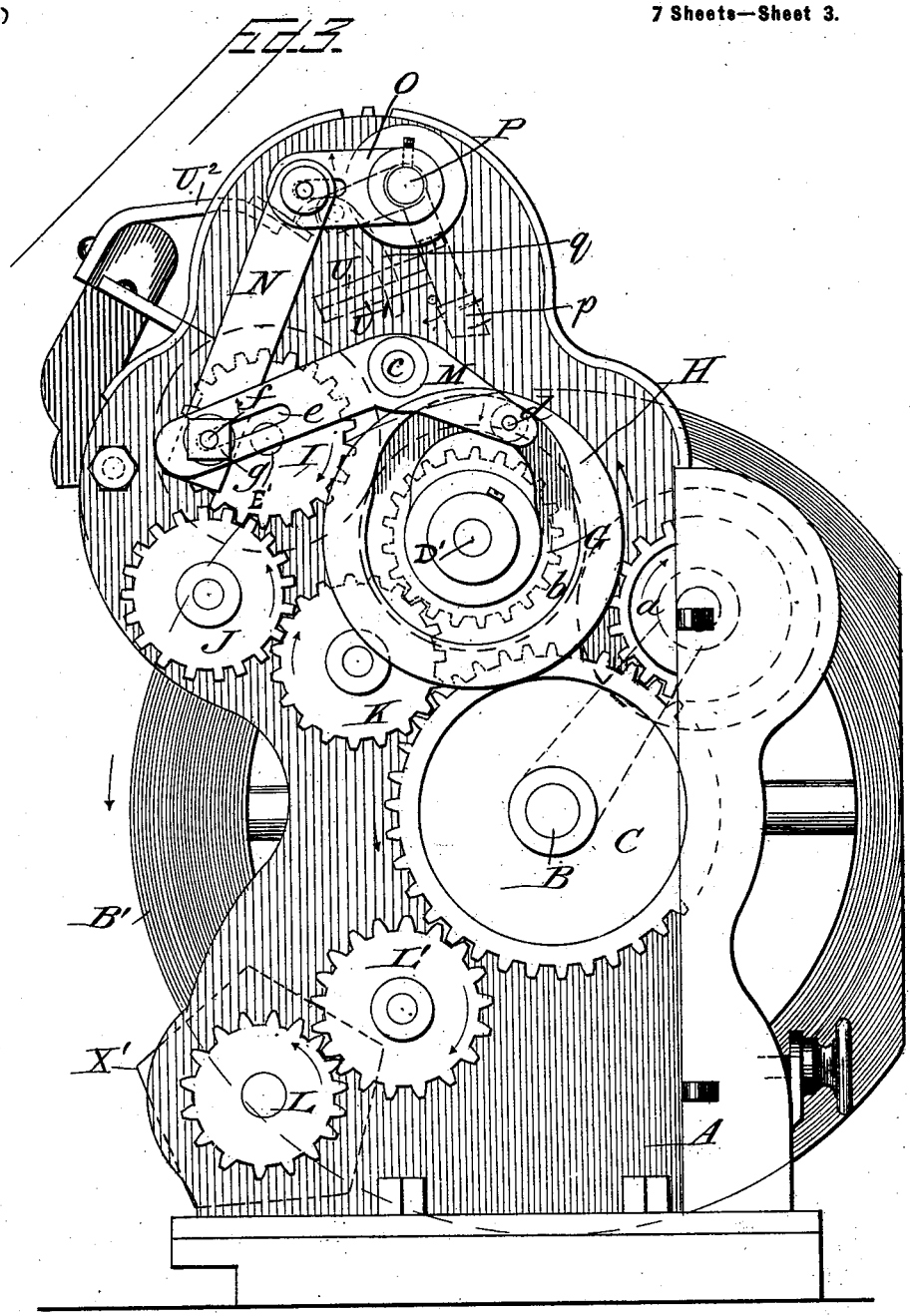

No. 689,820. Patented Dec. 24, 1901.
E. L. HOWARD.
POSTMARKING AND STAMP CANCELING MACHINE.
(Application filed Feb. 17, 1890.)
(No Model.) 7 Sheets—Sheet 4.
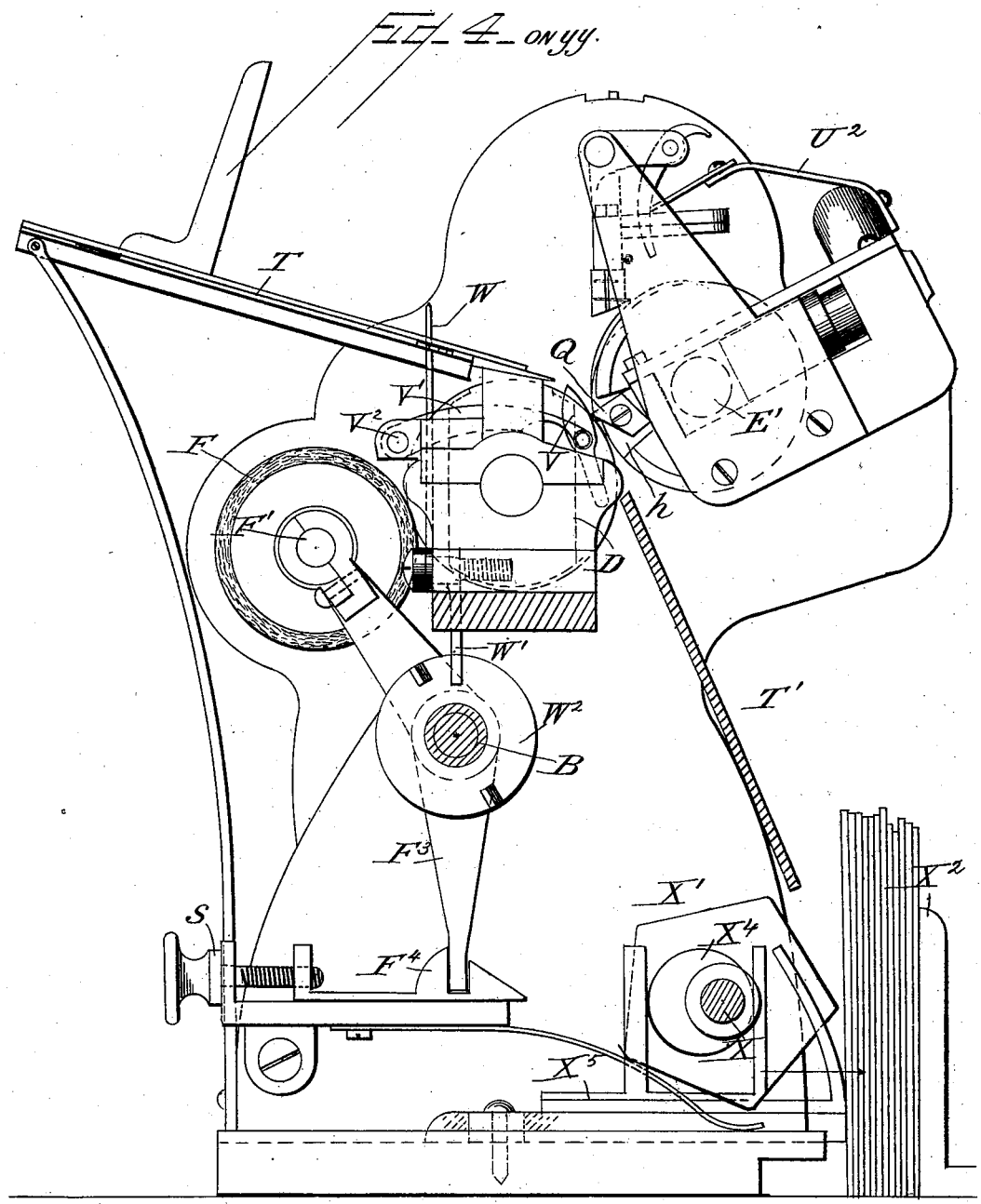

No. 689,820. Patented Dec. 24, 1901.
E. L. HOWARD.
POSTMARKING AND STAMP CANCELING MACHINE.
(Application filed Feb. 17, 1890.)
(No Model.) 7 Sheets—Sheet 5.
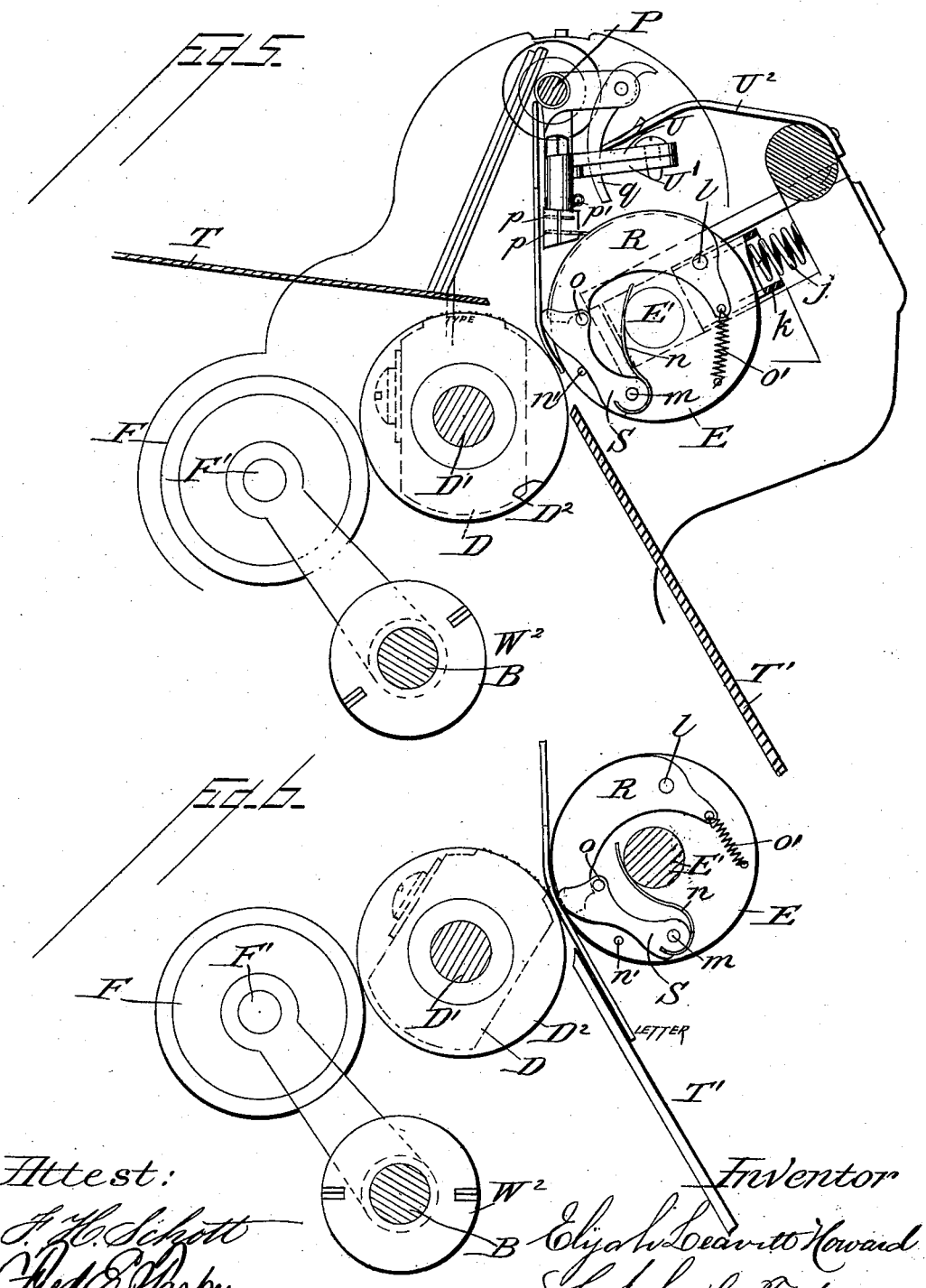

No. 689,820. Patented Dec. 24, 1901.
E. L. HOWARD.
POSTMARKING AND STAMP CANCELING MACHINE.
(Application filed Feb. 17, 1890.)
(No Model.) 7 Sheets—Sheet 6.
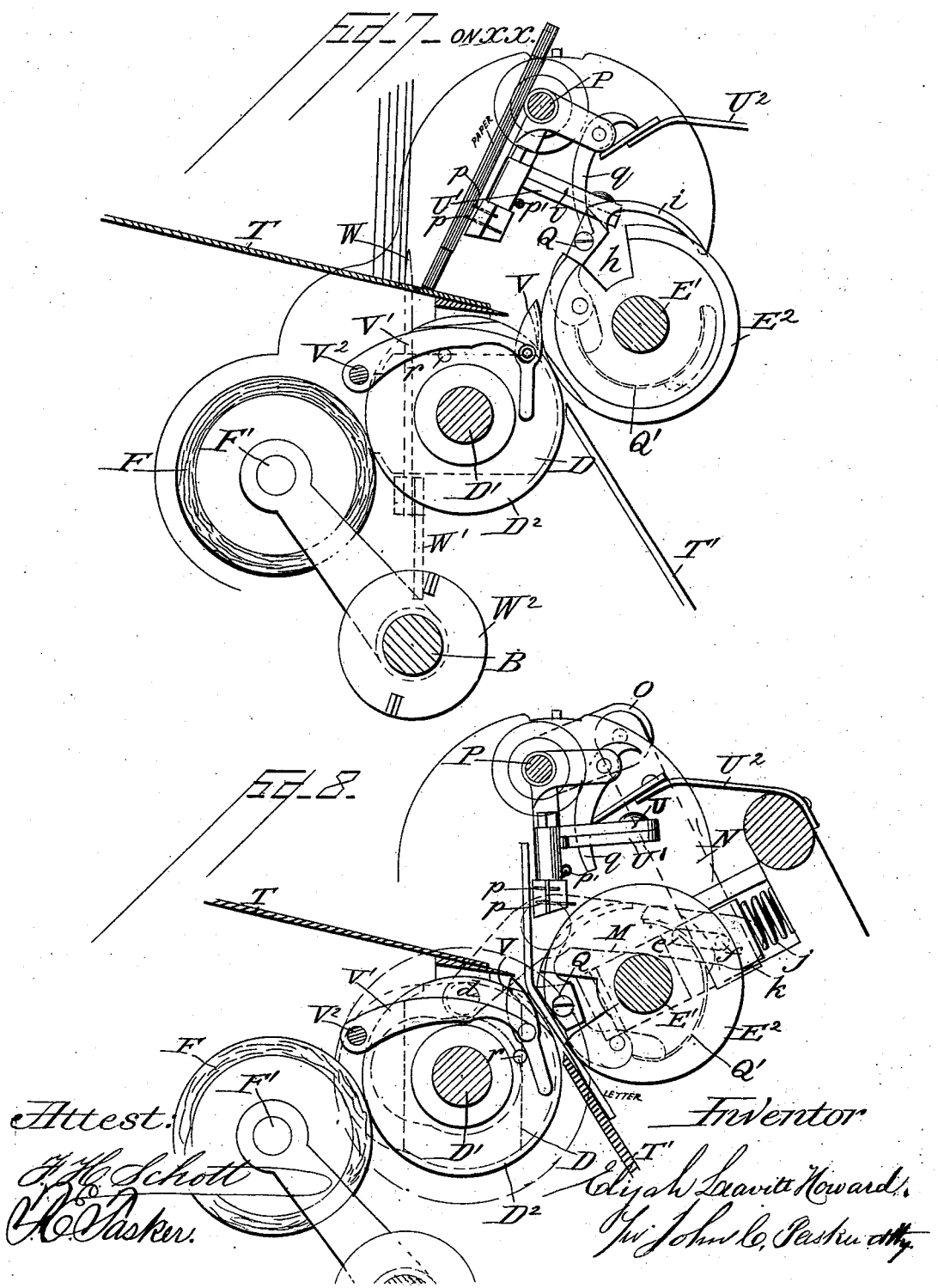

No. 689,820. Patented Dec. 24, 1901.
E. L. HOWARD.
POSTMARKING AND STAMP CANCELING MACHINE.
(Application filed Feb. 17, 1890.)
(No Model.) 7 Sheets—Sheet 7.
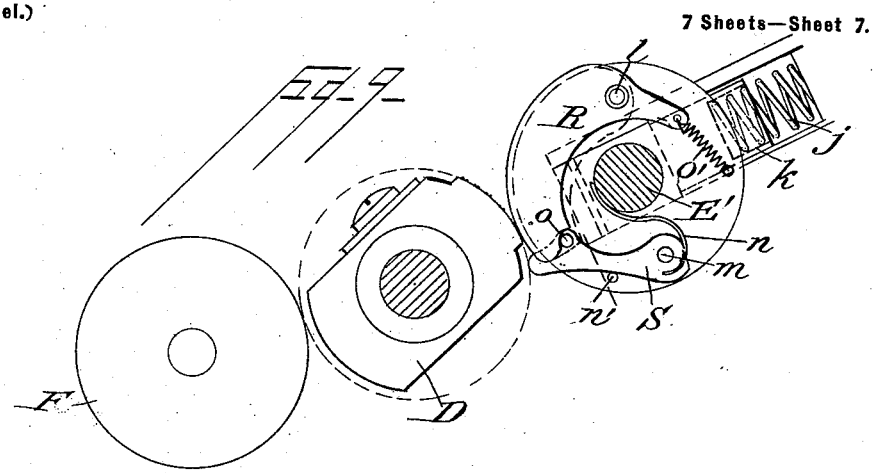
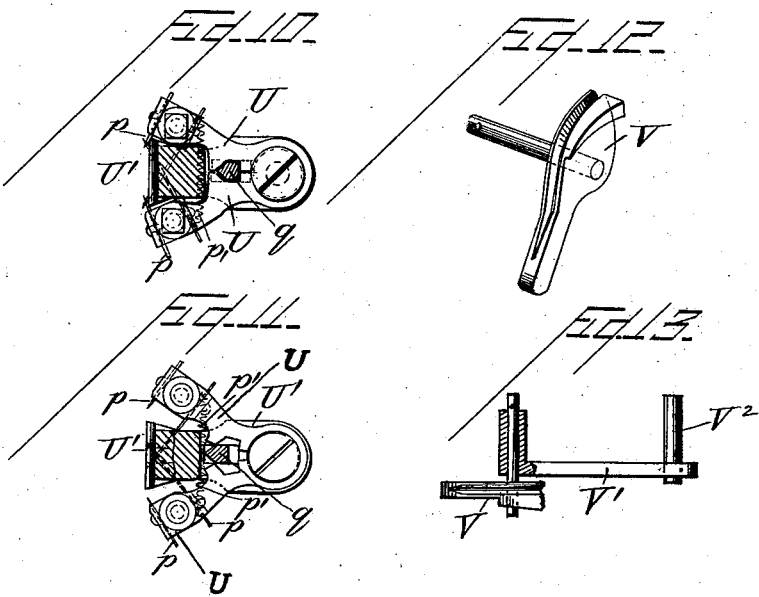

UNITED STATES PATENT OFFICE.

ELIJAH LEAVITT HOWARD, OF HINGHAM, MASSACHUSETTS, ASSIGNOR TO THE AMERICAN POSTAL MACHINE COMPANY, A CORPORATION OF MAINE.

POSTMARKING AND STAMP-CANCELING MACHINE.

SPECIFICATION forming part of Letters Patent No. 689,820, dated December 24, 1901.

Application filed February 17, 1890. Serial No. 340,766. (No model.)

*To all whom it may concern:*

Be it known that I, ELIJAH LEAVITT HOWARD, a citizen of the United States, residing at Hingham, in the county of Plymouth and State of Massachusetts, have invented certain new and useful Improvements in Postmarking and Stamp-Canceling Machines; and I do hereby declare the following to be a full, clear, and exact description of the invention, such as will enable others skilled in the art to which it appertains to make and use the same.

This invention relates to machines for stamp-canceling and postmarking letters, cards, and other mail-matter and delivering the same for sorting and distribution to the mails by one continuous series of appropriate mechanical operations, the object of the invention being to reduce the time, labor, and expense of preparing mail-matter for distribution and mailing, to render the operation of stamping more rapid and unfailing, and to provide a reliable machine adapted to operate automatically upon all classes and kinds of mail-matter which may be presented thereto without regard to the great inequalities usual in the size and thickness of letters and their envelops; and the invention consists in the construction, arrangement, and combination of parts, substantially as will be hereinafter fully described and claimed.

In the accompanying drawings, illustrating my invention, Figure 1 is a top plan view of my improved stamp-canceling and postmarking machine with some of the parts removed. Fig. 2 is a front elevation of the same, certain of the parts being removed for convenience in illustration. Fig. 3 is an end elevation showing the arrangement of the gearing. Fig. 4 is a vertical sectional end elevation on the line $y\ y$ of Fig. 2. Fig. 5 is a detail sectional end view of the printing and impression rollers and the feeding devices for delivering the letters thereto and shows the position of the parts at the time when the forward end of a letter is being introduced between the rollers. Fig. 6 is a similar detail view of the printing and impression rollers and shows their position and also that of the cams and lever when the letter is passing between them. Fig. 7 is a similar detail view to Fig. 5, taken on the line $x\ x$ of Fig. 1, and shows the position of the parts when no letter is passing and the feeding devices are beginning to grapple a piece of mail-matter to remove the same from the pack and put it into position to pass between the rollers. Fig. 8 is a similar view to Fig. 7, showing the piece of mail-matter passing between the rollers, the position of all the mechanical parts being correspondingly changed. Fig. 9 is a detail end view of the printing and impression rollers, showing their position when no letter is passing and indicating the action of the cams at this time in separating the rollers, so that the impression or feed roller may not become soiled by contact with the dies in the printing-roller. Fig. 10 is a detail view, in partial section, of the grappling-jaws constituting a part of the feeding devices, said jaws being shown as closed and with their needle-points projecting. Fig. 11 is a similar view of the grappling-jaws shown open and having their needle-points retracted. Fig. 12 is a perspective view in detail of the smooth-faced jaw which operates in conjunction with the clamping-foot when the letter is being delivered to the printing devices. Fig. 13 is a detail plan view of certain of the parts of the machine.

Like letters of reference designate corresponding parts throughout all the different figures of the drawings.

A designates the main frame of the machine, which may of course vary in its structure in any desired manner to permit the convenient arrangement therewith of the several mechanical parts that constitute my improved postmarking and stamp-canceling apparatus.

B denotes the main driving-shaft, which is journaled horizontally in the main frame. On one end of this shaft is the driving-wheel or pulley B', which receives motion from any convenient source of power. On the other end of shaft B is secured a gear-wheel C, which imparts motion to several other gears whereby the printing and impression rollers, the inking-roller, the feeding devices, and the packing mechanism are simultaneously actuated to cause a conjoint operation of all the parts of the machine.

The printing, marking, or canceling roller, cylinder, or device D, as it may be indifferently termed, is mounted upon a horizontal shaft D', journaled in the main frame. On this shaft, adjacent to one end of the printing-roller D, is a circular disk or wheel D², which forms a part of said roller D, said roller being preferably flattened instead of being completely cylindrical, and being provided with suitable postmarking and stamp-canceling dies inserted therein in any desirable manner, examples of these printing-dies being shown in Fig. 1. Likewise on the shaft D', near the end thereof, is a gear-wheel G and a cam H. The gear G engages a pinion K, turning on a stud on the frame, said pinion being engaged and driven by the gear C on the main shaft, and in this manner the printing-roller is rotated. The cam H consists of a circular disk mounted on shaft D' and having on its outer face a deeply-cut eccentric groove $b$, which guides the movements of the end of the rocker-arm M, as will be hereinafter explained.

The impression or feeding roller E, which supports the letter while it is being printed, has its shaft E' journaled in the main frame in a horizontal position, preferably at such points that the roller may be located somewhat higher than the printing-roller, (see Figs. 5, 6, and 7,) the two rollers being closely adjacent and adapted to revolve at certain times in contact with each other, although there is provision for the intermittent separation of their surfaces whenever the printing-dies come opposite the impression-roller, so as to prevent inking or soiling the latter. The roller E is preferably shorter than the printing-roller D in order to give the cams R, carried by the said roller E, opportunity to act upon the surface of the printing-roller. On the end of the shaft E' is mounted a pinion I, that engages a pinion J, turning on a stud on the frame, and it engages a pinion K, already mentioned. By these gearing connections, therefore, the impression or feeding roller is revolved during the operation of the machine. On the impression-roller shaft E', near to one end of the roller E, are two duplicate circular disks or wheels E² E², separated from each other by a short intervening space and of the same diameter as the roller E, said disks revolving in contact with the wheel D², which, we have already seen, is adjacent to the printing-roller on the same shaft as the latter, and said disks E² being similarly cut out to leave the recess or space $h$ in their peripheries. This space is occupied in part by a spring-foot Q, having a suitable width, which equals or exceeds, say, the width of the two disks. This foot is carried by a spring Q', fastened between the two disks, and it has a projecting guide-finger $i$, which lies between the disks. The tension of the spring that carries the foot keeps the latter usually projected beyond the periphery of the disks, so that it will be in position to come in contact with the wheel D², the result of which contact upon the foot will be to compress it into recess $h$, thus overcoming the tension of the spring. The practical use and action of the foot are to assist in clamping or drawing the letter between the rollers after the grappling devices have separated it from the pack and drawn it toward said rollers.

In the present example of my invention I have shown the printing-roller as being carried in non-adjustable bearings, so that said roller simply rotates and is not adjustable toward or away from the impression or feeding roller. The latter roller is carried in adjustable bearings, as will be seen by referring to Fig. 5, where I have shown one of the bearings $k$ for the impression-roller shaft provided with a coiled spring $j$ acting thereon, so that in this way the impression-roller is yieldingly arranged with relation to the printing-roller, and the two rollers therefore, while they normally revolve in contact with each other, may be at times separated to a greater or less degree. It will be noticed that this spring $j$ is stronger than the spring $o'$ and $n$, as well as stronger than the spring which supports the spring-foot Q, all of which springs will be hereinafter mentioned in the description.

Although in this example of my machine I have shown the printing-roller held in non-adjustable bearings and the impression-roller in adjustable bearings, yet I do not intend to confine myself to this special construction; but the reverse arrangement may be employed, if preferred, and the bearings of the impression-roller may be non-adjustable, while those of the printing-roller are adjustable. My aim is to so arrange the two rollers that one of them may be yieldingly mounted relatively to the other, and thus capable of an intermittent separation, and hence it matters not which roller is adjustably mounted, provided this object be accomplished.

Running through the impression or feed roller E, parallel to the shaft E' of said roller, is a rod $l$, on each end of which is secured a cam R. These cams are thus pivoted, as it were, to the roller by means of the aforesaid shaft, so that the latter serves as the center on which they turn. They have a curved edge or outline, which is adapted to come into coincidence with the periphery of the ends of the roller, as seen in Fig. 6, but which is adapted to project beyond said periphery, as shown in Figs. 4, 5, and 9.

S denotes a catch or controlling-lever which is pivoted at $m$ to one end of the roller E in close proximity to the yielding foot Q. A flat spring $n$, secured to the lever S near its pivotal point, and resting at its other end upon the shaft E' or some other convenient object, serves to force the catch-lever S outward into the letter-path with its end beyond the periphery of the roller E, in which position it rests upon a pin $n'$, which keeps it from moving too far outward by limiting such movement. Further, the lever S carries a pin $o$, and when said lever is held by spring $n$ in the position where it projects past the roller-periphery into the letter-path and bears on pin $n'$, as clearly indicated in Figs. 5 and 9, said pin $o$ rests beneath the end of the cam R on that end of roller where the catch or controlling lever is pivoted, and thus serves to maintain both the cams in the position where they project past the roller-peripheries, said position of the cams having been assumed under the action of the spring $o'$, which is connected to the end of one of the cams R on the other side of the pivotal point and also to the roller E. (See Figs. 5, 6, and 9.) So long as the catch-lever maintains its projecting position in the lever-path it will be obvious that any agency pressing upon the edge of the cams will be unable to rotate them, since they will be held rigidly by the supporting-pin on the catch-lever. Therefore if the impression-roller rotates with its cams in the projecting position they will act when they come in contact with the printing-roller to separate the two rollers slightly, the adjustable character of the impression-roller bearings permitting this yielding movement. Suppose, however, that some agency shifts the controlling-lever S from its normal position, as indicated in Fig. 5, into the position shown in Fig. 6, and thus removes the pin $o$ from beneath cam R. Then the cam R no longer having any support to hold it outward, except the spring, may easily be forced inward, and hence if the feeding-roller revolves its contact with the printing-roller will be maintained throughout the entire revolution and there will be no temporary separation of the rollers, as the cams, being no longer rigid, will yield when they touch the printing-roller. Now it will be observed that when the controlling-lever S is in its projecting position it will lie in the letter-path and its extremity will be in close proximity to the yielding foot Q. If no letter passes between the rollers, then no agency will act upon the controlling-lever to depress the same, and it will keep its position shown in Fig. 5, and the rollers will be separated at the proper time to avoid the soiling of the impression-roller by the printing-dies; but if a letter does pass it will be drawn between the rollers by the foot, and hence will be made to bear upon the controlling-lever, and in this way said lever will be depressed, (see Fig. 6,) and therefore as the letter passes between the rollers it will be postmarked and its stamps will be canceled, for the two rollers being in contact the letter will be moved carefully between them and the printing-dies permitted to register a neat mark. As the impression-roller is yielding, it will be obvious that the machine will operate equally well with letters, cards, newspapers, and all other kinds of mail-matter, no matter what may be the size, thickness, or shape. This construction, whereby a cam or cams are made use of to intermittently separate the two rollers, forms an important feature of the present invention. The mechanical idea which is found in this construction includes, of course, two rollers yieldingly mounted with respect to each other, one of which rollers or its shaft is provided with a cam; also, the lever which extends into the path of the mail-matter and acts in conjunction with the letter to control the operation of the cam, and thus permit the letter to be printed as it passes between the rollers. Thus it will be seen that the arrangement of the cam may be varied without departing from the spirit of this invention. Instead of two duplicate cams affixed rigidly to the ends of the rod, as shown, one or more cams may be arranged in a different manner upon the impression-roller shaft, and likewise the projecting lever in the letter-path may be differently located and may operate in a different manner to accomplish its purpose.

T denotes a platform that supports the cards, letters, envelops, or other pieces of mail-matter to be printed or canceled, said pieces of mail-matter being arranged upon the platform in an inclined edgewise position, so as to be more easily delivered by the feeding mechanism to the rollers. Below the rollers is an incline T', on which the pieces of mail-matter fall after being printed and by which they are delivered to the packing devices at the base of the machine.

Across the top of the machine extends a horizontal rock-shaft P, journaled in suitable bearings in the frame. To one end of this shaft is secured an arm O, which is pivoted to a link N. The other end of this link is pivoted adjustably to one end of a rocker-arm M, which is fulcrumed on a stud on the side of the frame. This rocker-arm has a slot $e$, which receives a pin $f$ on the link N, said pin being screw-threaded and provided with a nut $g$, so that by these means the connecting point of the link with the rocker-arm may be varied within certain limits to suit different cases. The other end of the rocker-arm is provided with a roller $d$, which enters and operates within the cam-groove $b$. When the machinery is in motion, the rocker-arm will vibrate at each revolution of the cam, and this through the connecting devices just described will oscillate the rock-shaft P and operate the feeding mechanism. This feeding mechanism for delivering the letters separately to the rollers is constructed and arranged as follows: It consists, essentially, of a grappling mechanism or separator comprising jaws U U, that are pivoted horizontally at their inner ends by means of the same pivot to a right-angled or other suitably-shaped frame U', suspended rigidly upon the rock-shaft P. These jaws are so constructed and arranged as to open and close alternately under the reciprocal or vibrating movement of the rock-shaft P. Each jaw U is provided with needles $p\ p$ for engaging the cards, letters, envelops, or other material upon the platform T, and thus separating and feeding this mail-matter piece by piece to the printing or canceling cylinder. The pins $p\ p$ are located in diagonal or inclined positions, and they play through slots and holes in the forward portion of the frame U', on each side of which the grappling-jaws are arranged and to the rear of which they are pivoted, as we have seen. Also said jaws are connected to the frame U' by means of springs $p'$ $p'$, which tend to draw the jaws toward each other, and consequently toward the frame U', and hence to project the needle-points $p$ $p$ beyond the face of frame U'. To the frame above the jaws is pivoted a catch-lever $q$, whose lower end lies and works between the said jaws, which are recessed at one point to receive the end of lever $q$ loosely, (see Fig. 10,) and when the end of the lever is within this recess the jaws are closed and the needle-points projected. The lever $q$ is so arranged that during the oscillations of the rock-shaft P its central part encounters an arm $U^2$, fastened to the main frame, and this results in moving the lever on its pivot and forcing it out of the recess between the jaws, so that it will pass between them in such a manner as to separate them, as shown in Fig. 11, and this movement opens the jaws and withdraws the needle-points from their exposed position. The reverse motion of lever $q$ also takes place at the proper time, when its extreme upper end strikes arm $U^2$ and causes its lower end to drop back into its recess, and thus the jaws close themselves under the action of the springs $p'$ $p'$. It will be observed that as the jaws U U are carried against the envelops or cards by the vibration of the rock-shaft P said jaws are caused to close against the adjacent card or envelop sufficiently to project the needles $p$ $p$ thereinto, as shown in Fig. 7. As these needles are in converging lines, they are capable of separating the first envelop or card from the pack when the rock-shaft in its backward movement withdraws the grappling-jaws, and the converging needles will thus hold and carry the card or envelop back, as shown in Fig. 8, in position to be passed between the cylinders. When the jaws U U are thus swung back, a corresponding rotary movement will of course be imparted to the rock-shaft P, the position of which in front of the pack of cards or envelops enables it to act as a stop to prevent the succeeding cards or letters from falling forward.

The backward movement of the jaws U U brings the lower end of the letter or other piece of mail-matter in contact with the clamping-foot Q, above described, which may be provided, if desired, with needles or pointed devices, which are thus brought into contact with the letter, the feeding-cylinder E, to which this clamping-foot is attached, having its rotation so regulated as to bring said foot into position to engage the letter at the proper time.

The backward movement of the card or envelop or other piece of material under the action of the grappling-jaws, as already described, is followed by the upward and forward movement of the smooth-faced jaw V, which is pivoted to the end of a lever V', which is pivoted to the main frame at $V^2$, which jaw is operated by a pin, roller, cam, or projection $r$ on the end of the printing-roller. (See Fig. 7.) The action of this smooth-faced jaw V is so regulated as to cause it to meet the yielding clamping-foot Q on the opposite cylinder at proper intervals, the lower end of the card or letter being then interposed between said jaw and foot, as shown in Fig. 8, and the card, envelop, or letter is thus conveyed between the cylinders by the clamping-foot. After the card, envelop, or other material has thus been printed or canceled by passing between the cylinders the continued action of the mechanism separates and brings down other material from the pack upon the platform piece by piece in a similar manner.

It is obvious that the grappling-jaws can be arranged in either a vertical or horizontal position and also that the relative arrangement of other parts of the mechanism can be correspondingly varied without affecting the operation of the devices. With a machine embodying the features above described cards, envelops, letters, or like material can be rapidly and accurately fed to the printing or canceling cylinders without the employment of friction or suction devices.

In order to prevent the lower edges of the cards, letters, or envelops from spreading fanlike over the platform T, and thus obviating any liability of more than one piece being fed to the rollers at one time, I may arrange a blunt-pointed needle or rod W through an aperture in said platform just in advance of the line of envelops, as shown in the drawings. The lower end of the rod or needle W is connected to one arm of a bell-crank W', that is pivoted on the main frame and is oscillated by a cam $W^2$ on the driving-shaft B, (see Fig. 2,) the mechanism being timed with the feed in such a manner that the rod or needle W will reciprocate vertically through an opening in the platform T in season to permit the separation and withdrawal of the end card or envelop next to the gripping mechanism, while it prevents the removal of the succeeding one until the proper time arrives. The letters, cards, or envelops upon the platform are thus prevented from spreading fanlike over its surface.

In Fig. 7 no letter is passing between the rollers, but a paper has just been detached from the bundle of mail-matter by the gripping devices and is about to be delivered to the rollers. The edge of the bundle of mail-matter is substantially upright in this figure, being so held by the rod W, which has been projected forward alongside of and in front thereof after the removal of the piece of mail-matter from the bundle.

In Fig. 5 the edge of the bundle has fallen forward in consequence of the depression of the rod W, so that it no longer acts as a stay for the bundle, and while in this position the outermost letter of the bundle will be picked therefrom by the gripping devices as soon as the latter have completed the delivery of the preceding letter to the printing devices.

Two structural features in this invention are particularly noticeable. One is a printing-couple, one member of which is yielding, so that the couple is not arranged for printing except when a letter passes, because when no letter or mail-matter is passing the printing member of the couple revolves continuously in contact with the impression member with the exception of an intermittent momentary separation of the two whenever the printing-dies come nearest the impression member. When a letter does pass, however, it comes in contact with a lever extending into the letter-path, which contact results in depressing the lever and acting upon separating mechanism for the members of the printing-couple, so that the intermittent momentary separation of the two members does not take place, but they remain in contact with the other and print the letter. The letter therefore acts in conjunction with the lever in the letter-path to permit the printing member of the printing-couple, which in the present instance is a roller, to perform its printing function.

It will be understood that the primary object of a construction of this kind is to enable a printing-roller to revolve in close contact with an impression-roller and yet never soil or ink the surface of the letter. This object is fully accomplished, and successfully, by my improved device. When a letter does not pass between the rollers, they revolve freely, but are intermittently separated, so that the dies never soil the surface of the impression-roller. Hence when a letter does pass the surface of the impression-roller is smooth and clean and the letter is not defaced by contact with said roller, but passes easily between the two rollers and is printed in the desired manner, the cancellation and postmark being impressed at the proper point on the face of the envelop.

F denotes the inking-roller. It is arranged in close proximity to the printing-roller, so that by contact therewith it may deliver ink to the latter. This roller is mounted on a shaft F', having a gear $a$ on its end, which engages the gear C, whence the inking-roller derives motion. The inking-roller shaft F' is supported in bearings in the ends of arms projecting upward from a sleeve $F^2$ on the main driving-shaft B, (see Fig. 2,) which sleeve has a downwardly-extending arm $F^3$, whose lower end enters a notch in a slide $F^4$. This slide is adjusted by means of a set-screw $s$. By manipulating this screw and reciprocating the slide to a greater or less extent in one direction or the other the sleeve on the main shaft may be correspondingly oscillated and the inking-roller adjusted with relation to the printing-roller, being brought into close contact therewith or removed from contact, whichever position of the inking-roller may be desirable and needful.

Journaled in the base of the machine is a horizontal shaft X, which is provided with a pinion L, engaging another pinion L', turning on a stud on the frame, and pinion L' is in turn engaged and actuated by the gear C on the main shaft. The shaft X carries a series of several wheels or cams, which in the present example of the invention are pentagonal wheels X', or wheels having a five-sided periphery. Other kinds of polygonal wheels may be used, if desired, in lieu of the pentagonal form. As the canceled or printed letters drop down the incline T' and fall in an inclined edgewise position the packing-cams will revolve against them and operate to pack them in a continuous series. (See Fig. 4.) A stop $X^2$ may be employed, between which and the packing-cams the line of letters will be arranged by the action of the cams thereon, which cams propel the letters in a continuous series toward the said stop. Shaft X carries also a cam $X^4$, operative upon an arm of the slide $X^5$, which acts as a pusher on the letters, so that the packer may not become clogged.

Having thus described my invention, what I claim as new, and desire to secure by Letters Patent, is—

1. The combination with the two rollers or cylinders, one of which is yieldingly mounted relatively to the other, of one or more yielding cams on one of the rollers and a lever in the letter-path likewise pivoted to one of the rollers and operating in connection with the cam.

2. In a letter stamping or marking machine, the combination of a marking-roller, a roller-bed yieldingly arranged opposite the marking-roller for supporting the article to be marked and a lever in the letter-path together with a yielding cam on one of the rolls.

3. The combination with the yieldingly-arranged letter-supporting roller, of feeding devices for moving the letter to said roller, a marker and a lever in the letter-path operating to permit the marking-roller to print, together with a yielding cam on one of the rollers.

4. The combination with the two rollers or cylinders, one of which is yieldingly mounted relatively to the other, of one or more cams on one of said rollers and a lever in the letter-path pivoted to the roller having the cams and operating to sustain said cams in their projected position where they act to intermittently separate the rollers except when a letter acts in conjunction with the lever to depress the same and render the cams idle, together with a spring which acts to place the cams in their projected position.

5. The combination with the two rollers or cylinders, one of which is yieldingly mounted relatively to the other, of a cam on one of said rollers, a lever in the letter-path operating in connection with the cam, and the yielding clamping-foot, together with the jaw which operates in connection with said foot.

6. The combination with the two rollers or cylinders, one of which is yieldingly mounted relatively to the other and a cam on one of the rollers, a lever in the letter-path connected with said cam, the yielding clamping-foot and the smooth-faced jaw which assists in passing a letter between the rollers, and the feeding devices for delivering the letters to the rollers.

7. The combination of a marking-roller and an impression-roller, one of which is yieldingly mounted relatively to the other, said rollers being intermittently separated when no letter is passing, the cams, one on each end of one of said rollers affixed to a pivotal rod running through it, and the lever in the letter-path pivoted to the end of said roller and having a pin which supports the cams in their projected position, together with the spring for said lever and the spring for the cams, substantially as described.

8. In a stamp-canceling and postmarking machine, the combination of the marking-roller having a pin or projection on the end thereof, the impression-roller which is yieldingly mounted relatively to the marking-roller, the cams at each end of the impression-roller secured to the pivotal rod passing through the same, the spring-actuated lever in the letter-path pivoted to the end of the impression-roller and operating in connection with the cams, the yielding spring-provided clamping-foot, the smooth-faced jaw pivoted to the lever which is movably connected to the frame and operated upon by the pin on the marking-roller, substantially as described.

9. In a stamp-canceling and postmarking machine, the combination of the feeding devices, consisting essentially of grappling needle-provided jaws that engage the letters as specified, the marking-roller and yieldingly-mounted impression-roller, the cams at each end of the impression-roller affixed to a pivotal rod running through the same, said cams being provided with a spring whereby they are projected, the spring-actuated lever in the path of the letter operating in connection with the cams, and the smooth-faced clamping-jaw pivoted to a lever which is acted upon by a pin on the end of the marking-roller, together with the yielding clamping-foot, substantially as described.

10. In a stamp-canceling and postmarking machine, the packing mechanism consisting in the combination with a rotary shaft, of a series of polygonal wheels secured thereon, and a pusher device.

11. In a stamp-canceling and postmarking machine, the combination with the marking and impression rollers, of the incline located below the same, down which the letters fall, and the packing devices arranged at the base of said incline and consisting of a horizontal rotary shaft and a series of polygonal wheels secured on said shaft and acting to pack the letters in a continuous series, substantially as described.

12. The combination of the marking-roller and its shaft, having thereon a gear and a cam-wheel, having on its outer face an eccentric groove, the impression-roller and its shaft having thereon a gear, the intermediate pinions connecting said gears, the main driving-shaft and its actuating-gear engaging one of said pinions, the rock-shaft carrying the feeding devices, the rocker-arm pivoted to the main frame and having one end provided with a roller which enters the cam-groove and is thus operated by the cam on the marking-roller shaft, the other end of said rocker-arm connecting by a link with an arm on the aforesaid rock-shaft, substantially as described.

13. The combination of the marking-roller and its shaft having thereon a gear and a cam-wheel, the impression-roller and its shaft having thereon a gear, the intermediate pinions between said gears, the main driving-shaft and its actuating-gear which engages one of said pinions, the inking-roller and its shaft having thereon a gear meshing with the main actuating-gear, the rock-shaft carrying the feeding devices and provided with an arm, the rocker-arm pivoted to the main frame and having one end thereof operated by a cam-wheel on the marking-roller shaft, while the other end connects loosely by a link with the rock-shaft arm, the packing-wheels and their shaft having thereon a pinion operated by an intermediate engaging the main actuating-gear, all substantially as described.

14. In a stamp-canceling and postmarking machine, the combination with the marking-roller, of an inking-roller whose shaft is supported by arms connected to a sleeve mounted on the main driving-shaft, said sleeve having a downwardly-projecting arm which is engaged by a slide governed by a set-screw so that the position of the inking-roller may be regulated with respect to the marking-roller, all in combination with the main shaft on which said sleeve is mounted, as described.

15. In a stamp-canceling and postmarking machine, the combination with the letter-platform, of a vertical pointed rod projecting through the same, a bell-crank pivoted to the main frame to which the lower end of the rod is connected and the main driving-shaft and a cam thereon operating upon the other arm of the bell-crank to move said rod so as to enable it to serve as a letter stop and separator, as specified.

16. In a stamp-canceling and postmarking machine, the combination of the marking-roller, the impression-roller yieldingly mounted with relation thereto, the cams R R at each end of the impression-roller affixed rigidly to the pivotal shaft $l$ running through the same, the spring $o'$ connected to the end of one of the cams and to the impression-roller, the lever S in the letter-path having the spring $n$ which keeps the lever normally projected, the stop-pin $n'$ on which the lever S bears and a pin $o$ carried by said lever and resting beneath one of the cams R for the purpose of keeping the latter normally projected, substantially as described.

17. In a stamp-canceling and postmarking machine, the combination of the marking-roller D, having on the end thereof a pin $r$, the impression-roller E, carried in adjustable spring-actuated bearings, the cams R R at each end of the impression-roller rigidly affixed to the pivotal rod $l$ running through the same, spring $o'$ acting on the cams, the lever S in the letter-path having the spring $n$, said lever being pivoted at $m$ to the impression-roller and carrying the pin $o$ that rests beneath one cam R for the purpose stated, the stop-pin $n'$ on which the lever S bears, the yielding clamping-foot Q having the projecting finger $i$, the smooth-faced jaw V, pivoted to the lever V', which lever is operated by means of the aforesaid pin $r$ on the marking-roller, all substantially as described.

18. The combination of the packing mechanism consisting of the horizontal rotary shaft having one or more polygonal wheels secured thereon, a cam likewise on said shaft and a pusher sliding beneath the shaft and operated by said cam, substantially as described.

19. The combination of the shaft with its packing-wheels the cam and the cam-operated pusher, substantially as described.

20. The combination with the rotary shaft and a packer thereon, of the cam and the pusher operated thereby.

21. The combination of the shaft and rotary packing devices thereon, of a pusher likewise actuated by the shaft.

In testimony whereof I affix my signature in presence of two witnesses.

ELIJAH LEAVITT HOWARD.

Witnesses:
GEO. WM. ESTEBROOK,
HENRY E. WAITE.